United States Patent [19]

Martin

[11] 3,831,994
[45] Aug. 27, 1974

[54] SAFETY HOOK
[75] Inventor: Robert Martin, Fort Smith, Ark.
[73] Assignee: United States Forgecraft Corporation, Fort Smith, Ark.
[22] Filed: June 4, 1973
[21] Appl. No.: 366,269

[52] U.S. Cl............................ 294/82 R, 24/241 PS
[51] Int. Cl............................................. B66c 1/36
[58] Field of Search............ 294/82 R, 83 R, 83 AB, 294/78, 74, 75; 24/241

[56] References Cited
UNITED STATES PATENTS
| 1,517,019 | 11/1924 | Serl | 294/82 R X |
| 1,618,321 | 2/1927 | Woods | 24/241 PS |
| 3,568,269 | 3/1971 | Moretti | 24/241 PS |

*Primary Examiner*—Richard A. Schacher
*Assistant Examiner*—James L. Rowland
*Attorney, Agent, or Firm*—Fishburn, Gold & Litman

[57] ABSTRACT

A safety hook for use in lashing equipment, load supports, safety harness, and the like, include a hook having a shank and a latch member mounted on a pin having its axis transversely of the hook shank and having a tongue engaging the hook nose to normally prevent removal of a connector engaged with the hook. The latch member has a portion engageable by a keeper in first position to prevent opening a hook portion of the shank. The keeper is movable transversely of the shank to a second position to release the latch member for movement thereof for access through the hook opening. Resilient members urge the latch member and keeper toward hook closing positions and maintain same therein until favorably maintained. The latch member and the keeper are movable in substantially normal or perpendicular planes whereby simultaneous accidental movement of both is highly unlikely.

6 Claims, 6 Drawing Figures

PATENTED AUG 27 1974

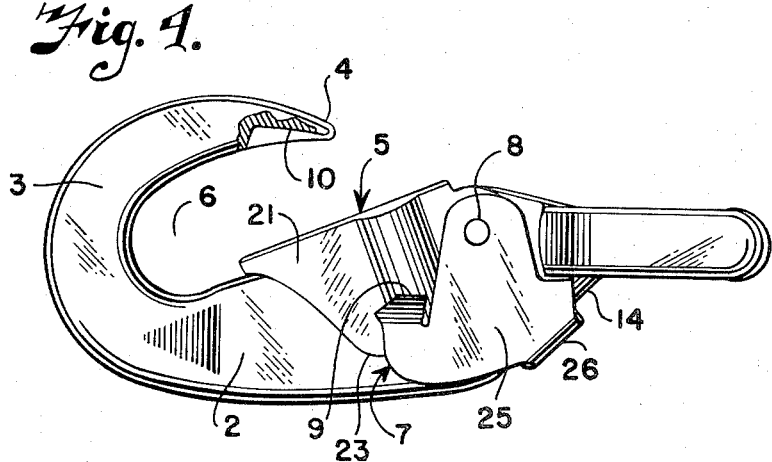
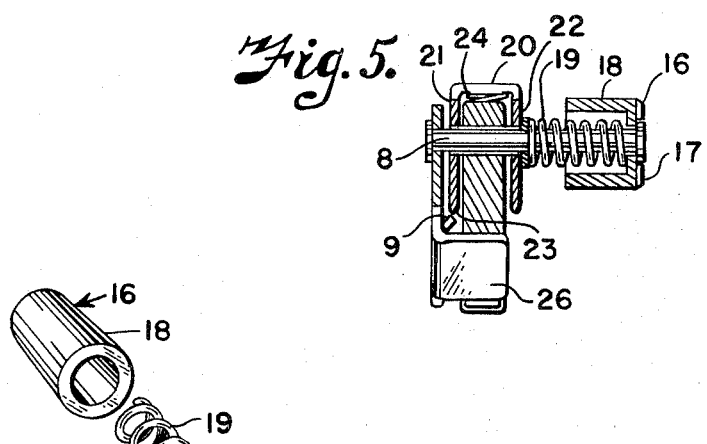
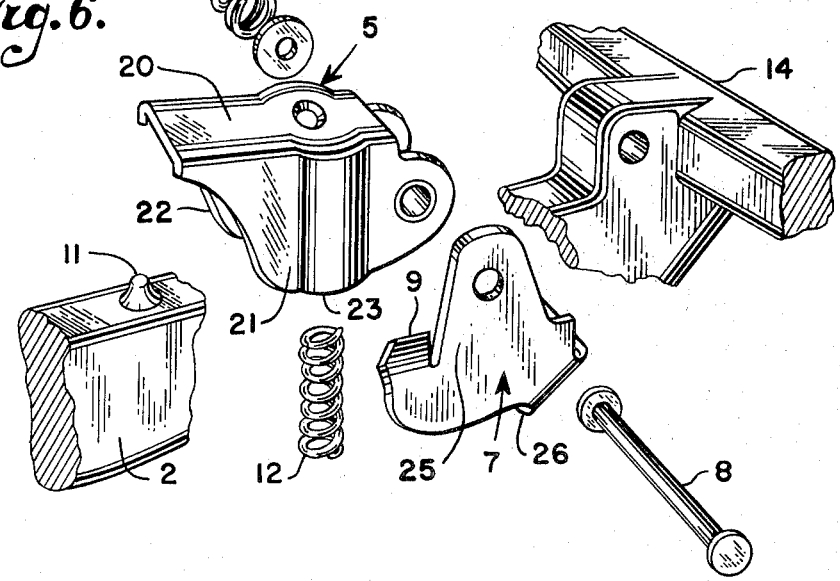

SAFETY HOOK

The present invention relates to safety hooks and, more particularly, to a safety hook having a keeper movable laterally or transversely of a hook shank and between a first position engageable with a latch member and a second position releasing the latch member.

The principal objects of the present invention are: to provide a safety hook having a keeper engageable by a latch member to maintain the latch member in position closing the mouth of the hook to prevent a ring, rope, or the like from passing through the mouth of the hook and becoming disconnected from the hook; to provide such a safety hook wherein the latch member and the keeper are movable in substantially normal planes whereby simultaneously and accidentally moving both is highly unlikely; to provide such a safety hook with a latch member movable between an open position and a closed position and a keeper having an abutment portion engageable by the latch member to retain same in the closed position; to provide such a safety hook having a keeper movable transversely of the latch member to selectively be engaged by and spaced from the latch member; to provide such a safety hook adapted to positively retain the latch member in a position closing a hook mouth; and to provide such a safety hook which is economical to manufacture, durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include an exemplary embodiment of the present invention and illustrate various objects and features of the safety hook:

FIG. 4 is a side elevational view of the one side of the safety hook showing a latch member and keeper in a release position.

FIG. 5 is a transverse sectional view taken on line 5—5, FIG. 3.

FIG. 6 is a fragmentary exploded perspective view of the components of the safety hook.

Figure 1:
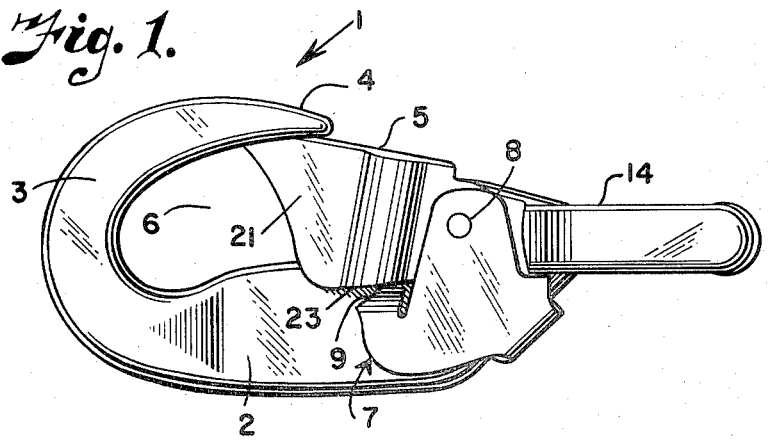
FIG. 1 is a side elevational view of one side of a safety hook embodying features of the present invention.
Figure 2:
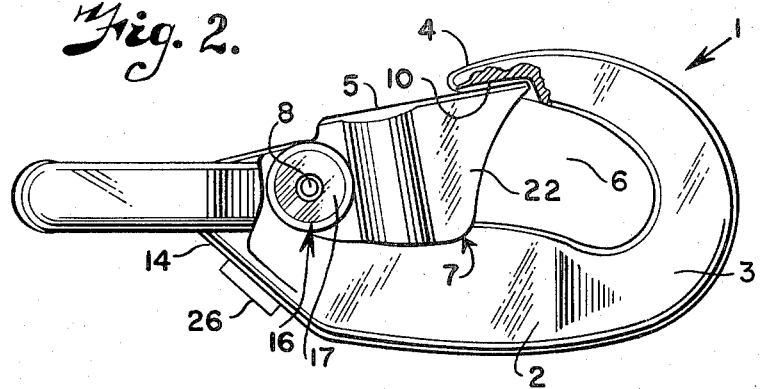
FIG. 2 is a side elevational view of the other side of the safety hook.
Figure 3:
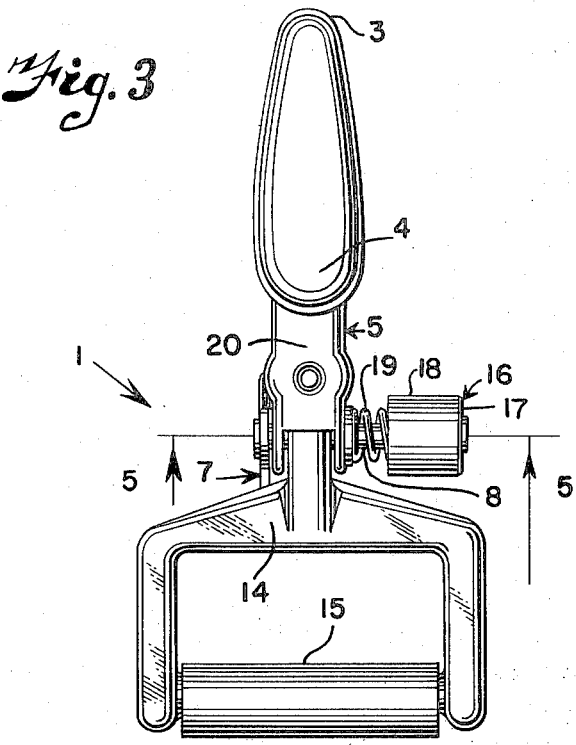
FIG. 3 is a front elevational view of the safety hook.

Referring more in detail to the drawings:

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates a safety hook for use in lashing equipment, window washer's harness, load supports, and the like. The safety hook 1 includes a shank 2 having a return bend or hook portion 3 at one end thereof which terminates in a nose 4 engaged by one end of a latch member 5 thereby closing a mouth 6 defined by the shank 2, hook portion 3, and latch member 5. A keeper 7 is mounted on a pin 8 and is movable transversely of the shank 2 and latch member 5. The keeper 7 is movable between a first position having an abutment portion 9 engageable by the latch member 5 to retain same in a position closing the mouth 6 and a second position having the abutment portion 9 spaced from the latch member 5 to permit movement of same to open the mouth 6. Resilient members urge the latch member 5 and keeper 7 toward hook closing positions and maintain same therein until forceably moved. The latch member 5 and the keeper 7 are movable in substantially normal or perpendicular planes whereby simultaneous accidental movement of both is highly unlikely.

The shank 2 may be any desired shape, however, the shank 2 is illustrated as an elongated member having a body portion which is generally planar and has an aperture therethrough immediate the ends thereof to receive the pin 8. The hook portion 3 is a return bend having the nose 4 at the end thereof formed with a recess 10 adapted to receive the one end of the latch member 5 thereby closing the mouth 6 as defined by the shank 2, hook portion 3, and latch member 5.

The shank 2 has a projection 11 extending from the planar portion thereof and positioned intermediate the ends of the shank 2 and the projection 11 is adapted to receive one end of a resilient member 12, as later described. The other end of the shank 2 has suitable means thereon for attaching a load support member, such as lashing, belts, or the like. In the illustrated structure, the other end 14 of the hook shank 2 is formed as a D-ring having a suitable sleeve 15 adapted to be engaged by suitable lashing extending through the D-ring.

The aperture extending transversely through the hook shank 2 is positioned intermediate the ends thereof for receiving the pin 8 which is illustrated as an elongated generally cylindrical member. The pin 8 has a retainer 16 mounted on one end thereof and having an end wall or abutment 17 extending substantially perpendicular or normal to the axis of the pin 8. The retainer 16 has a sidewall 18 extending from the end wall or abutment 17 to define a sleeve or recess adapted to receive and retain one end of a resilient member 19, as later described.

The latch member 5 may be any suitable member adapted to close the mouth 6 and in the illustrated structure, the latch member 5 is generally U-shaped and has a web portion 20 having one end thereof adapted to be received in the recess 10 in the nose 4 at the end of the hook portion 3. Spaced flanges 21 and 22 extend from the web portion 20 and are positioned on respective opposite sides of the hook shank 2. An edge 23 of one of the flanges, for example flange 21, is positioned adjacent the shank 2 and defines an abutment adapted to engage the abutment portion 9 of the keeper 7 when the latch member 5 is moving from a closed position toward an open position and thereby prevent such movement.

The web portion 20 of the latch member 5 has a projection 24 extending into the space between the flanges 21 and 22 and adapted to receive an other end of the resilient member 12 which is adapted to urge the latch member 5 toward and resiliently maintain same in a position closing the mouth 6.

The latch member 5 is movable between a position closing the mouth 6 and a position opening same and in the illustrated structure, the latch member 5 is pivotally mounted on the pin 8, as by suitable ears extending from the flanges 21 and 22 and having suitable apertures therethrough. Bushings may be mounted in the apertures in the flanges 21 and 22 to provide smooth operation and minimum wear on the pin 8 when the pin 8 is moving transversely or laterally of the hook shank 2.

The flanges 21 and 22 each have outwardly enlarged portions adapted to partially surround the resilient member 12 and retain same in position between the web portion 20 and the shank 2.

The keeper 7 is illustrated as having an ear 25 mounted on the pin 8 at an end thereof spaced from the retainer 16. The abutment portion 9 of the keeper 7 is illustrated as a tooth or detent extending from the ear 25 and adapted to be positioned under the enlarged portion of one of the flanges, for example flange 21, of the latch member 5 and engageable by the edge 23 thereof when the latch member 5 is moved toward the shank 2 to open the mouth 6 thereby maintaining the latch member 5 in the closed position. The abutment portion 9 of the keeper 7 is maintained in position to be engaged by the latch member 5 when the pin 8 and the keeper 7 are in the first position by a guide portion 26 extending from the ear 25 and engageable with the shank 2 thereby preventing turning of the ear 25 and the abutment portion 9 extending therefrom.

The resilient member 19 urges the pin 8 and the keeper 7 toward a position having the abutment portion 9 positioned to be engaged by the edge 23 of the flange 21 of the latch member 5. The resilient member 19 is illustrated as a compression spring sleeved on or around the pin 8 and having one end in engagement with the abutment member 17 of the retainer 16 and the other end engaging the other flange 22 of the latch member 5.

In using a safety hook constructed as illustrated and described, the mouth 6 is opened to receive a rope, ring, or the like by forceably moving the keeper 7 laterally of the shank 2 to a position having the abutment portion 9 thereof spaced from the latch member 5 which is then forceably moved away from the nose 4 and toward the shank 2. After the rope, ring, eye, or the like is in position within the mouth 6, the latch member 5 and the retainer 16 are each released thereby allowing the resilient member 19 to return the keeper 7 toward the intermediate portion of the hook shank 2 thereby positioning the abutment portion 9 thereof adjacent the edge 23 of the flange 21 whereby any attempt to depress the latch member 5 and the resilient member 12 will be resisted by the abutment portion 9 thereby positively retaining the respective member within the mouth 10. Accidental movement of the latch member 5 toward the shank 2 and simultaneous accidental movement of the retainer 16 toward the shank 2 in a plane normal to the movement of the latch member 5 is highly unlikely whereby the hook 1 is particularly adapted to retain a rope, ring, eye, or the like within the mouth 6.

It is to be understood that while I have illustrated and described one form of my invention, it is not to be limited to the specific form or arrangement of parts herein described and shown.

What I claim and desire to secure by Letters Patent is:

1. A safety hook comprising:
    a. a shank having a return portion at one end thereof to define a hook and having a nose spaced from the shank to define a hook mouth;
    b. means on the other end of said shank for attaching a load support member;
    c. a latch member having one end pivotally mounted on said shank and the other end engageable with the hook nose to close the hook mouth;
    d. a pin extending transversely through said shank;
    e. means engaging said pin for effecting selective movement of said pin transversely of said shank between a first position and a second position;
    f. a keeper mounted on said pin and movable therewith transversely of said shank, said keeper having an abutment means normally engaged by said latch member when in hook closing position to maintain same in hook closing position and released from said latch member in response to said transverse movement for swinging of said latch member to hook opening position;
    g. an ear mounted on said pin and having the abutment means extending therefrom; and
    h. a guide portion extending from said ear and engageable with said shank to thereby maintain the abutment means in position to be engaged by said latch member.

2. A safety hook comprising:
    a. a shank having a return portion at one end thereof to define a hook and having a nose spaced from the shank to define a hook mouth;
    b. means on the other end of said shank for attaching a load support member;
    c. a latch member having one end pivotally mounted on said shank and the other end engageable with the hook nose to close the hook mouth;
    d. a pin extending transversely through said shank;
    e. means engaging said pin for effecting selective movement of said pin transversely of said shank between a first position and a second position;
    f. a keeper mounted on said pin and movable therewith transversely of said shank, said keeper having an abutment means normally engaged by said latch member when in hook closing position to maintain same in hook closing position and released from said latch member in response to said transverse movement for swinging of said latch member to hook opening position;
    g. said latch member has a first portion engageable with the hook nose of said shank and a second portion extending substantially normal to the first portion and having an edge positioned adjacent said shank;
    h. resilient means extend between said shank and the first portion of said latch member to urge same into engagement with the hook nose of said shank;
    i. said keeper has an ear mounted on said pin and having the abutment means extending therefrom and engageable by the edge of the second portion of said latch member; and
    j. said keeper has a guide portion extending from said ear and engageable with said shank to thereby maintain the abutment means in position to be engaged by the edge of the second portion of said latch member.

3. A safety hook comprising:
   a. a shank having a return portion at one end thereof to define a hook and having a nose spaced from the shank to define a hook mouth;
   b. means on the other end of said shank for attaching a load support member;
   c. a latch member having one end pivotally mounted on said shank and the other end engageable with the hook nose to close the hook mouth, said latch member being swingable between a hook mouth closing position and a hook mouth open position;
   d. a pin extending transversely through said shank;
   e. means engaging said pin for effecting selective movement of said pin transversely of said shank between a first position and a second position;
   f. a keeper connected to said pin and movable thereby transversely of said shank, between said first position and second position, said keeper having an abutment means spaced from said pin and normally engaged by said latch member to retain same in hook mouth closing position when in said first position and releasing said latch member for swinging movement when in said second position;
   g. means on said keeper in spaced relation to said pin and engaging said shank in said transverse movement to retain said keeper from swinging movement about said pin;
   h. resilient means urging said keeper to said first position.

4. A safety hook comprising:
   a. a shank having a return portion at one end thereof to define a hook and having a nose spaced from the hook shank to define a hook mouth;
   b. means on the other end of said shank for attaching a load support member thereto;
   c. a pin extending transversely through said shank;
   d. a latch member having one end mounted on said pin and the other end engageable with the nose at the return portion of said shank to close the hook mouth;
   e. means engaging said pin for effecting selective movement of said pin transversely of said shank between a first position and a second position and for urging said pin toward and retaining same in the first position; and
   f. a keeper mounted on said pin and movable therewith transversely of said shank, said keeper having an abutment means normally engaged by said latch member when in hook closing position to maintain same in hook closing position and released from said latch member in response to transverse movement for swinging of said latch member to hook opening position, said keeper and said latch member being movable in substantially normal planes.

5. A safety hook as set forth in claim 4 wherein:
   a. said latch member has a first portion engageable with the nose at the return portion of said shank and spaced flanges extending from the first portion and positioned on respective opposite sides of said shank;
   b. one of the flanges has an edge positioned adjacent said shank;
   c. said pin extends through both of said flanges whereby the other end of said latch member is pivotally mounted on said pin;
   d. said keeper is mounted on one end of said pin; and
   e. said means for effecting movement of said pin and for urging said pin toward and retaining same in the first position includes:
      1. a retainer mounted on the other end of said pin; and
      2. a resilient member engaging said retainer and an adjacent flange of said latch member and adapted to urge said pin toward and retain said pin in the first position with said keeper positioned to have the abutment means engageable by the edge of the one flange of said latch member.

6. A safety hook as set forth in claim 5 wherein said keeper comprises:
   a. an ear mounted on the one end of said pin and having the abutment means extending therefrom and toward said shank; and
   b. a guide portion extending from said ear and engageable with said shank to thereby maintain the abutment means in position to be engaged by said edge of the one flange of said latch member.

* * * * *